H. T. SWEENEY.
ILLUMINATED RADIATOR THERMOMETER.
APPLICATION FILED MAY 28, 1920.
1,363,540.
Patented Dec. 28, 1920.
2 SHEETS—SHEET 1.
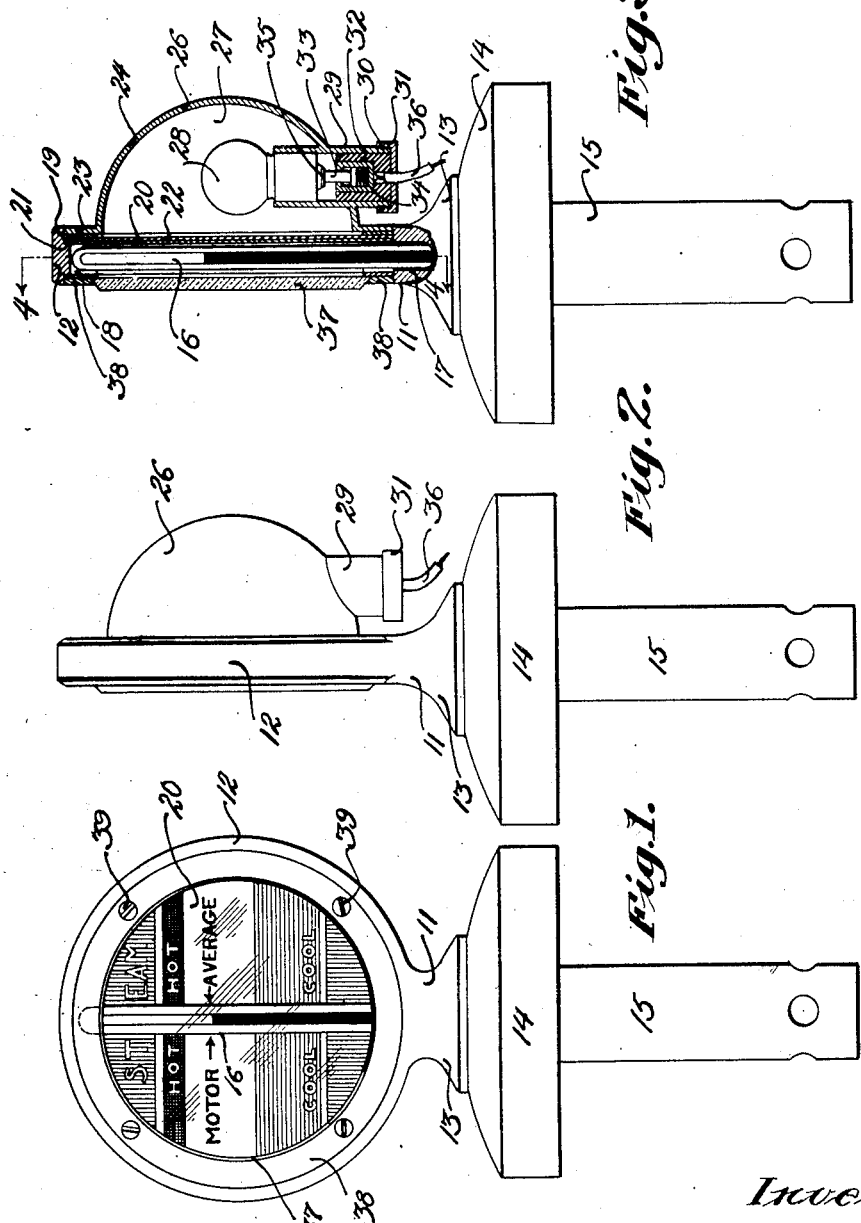
Witnesses
Geo. A. Gruse
Augustus B. Coppes
Inventor
Herbert T. Sweeney
By Joshua R. H. Potts
his Attorney

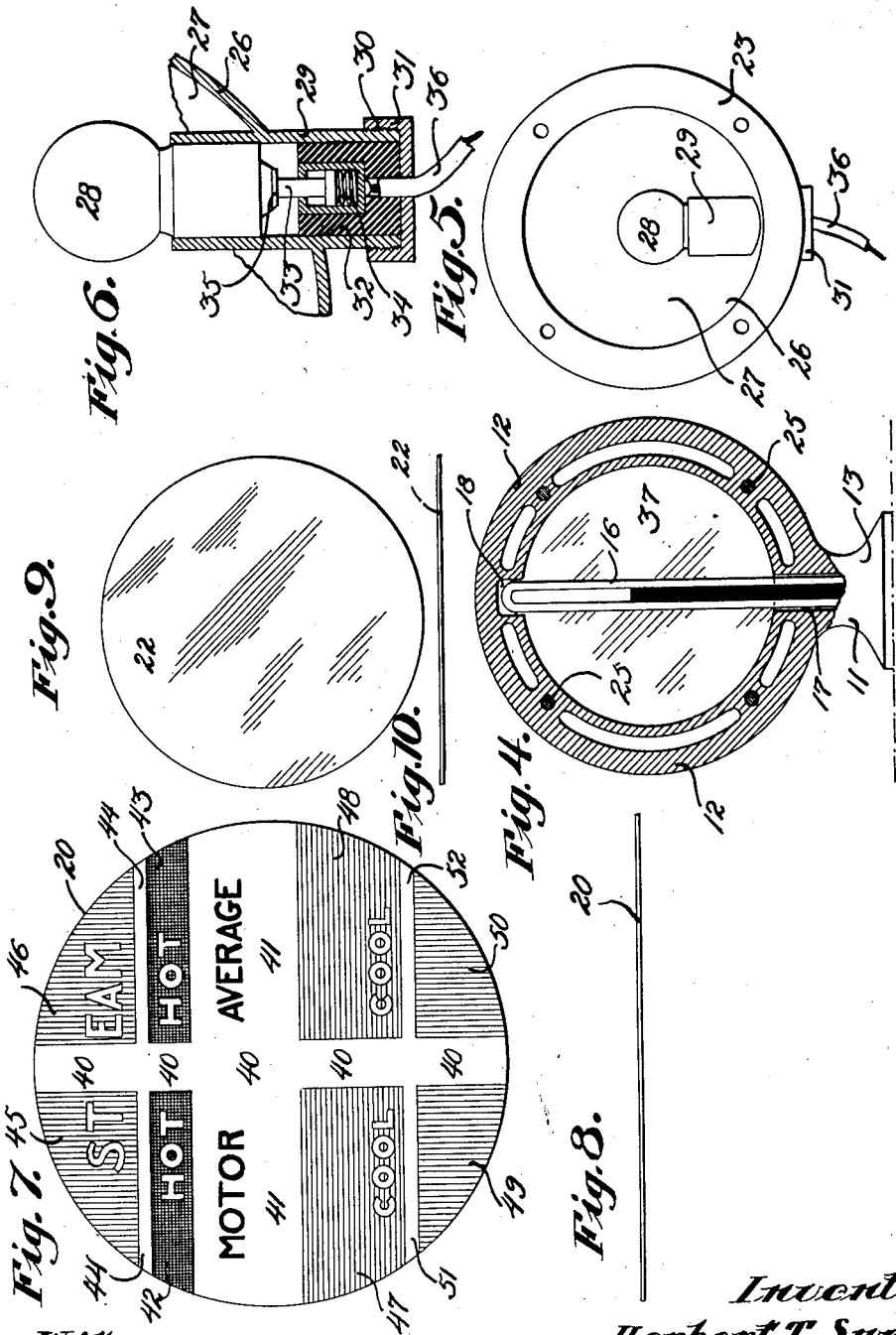

UNITED STATES PATENT OFFICE.

HERBERT T. SWEENEY, OF CHESTER, PENNSYLVANIA.

ILLUMINATED RADIATOR-THERMOMETER.

1,363,540.  Specification of Letters Patent.  Patented Dec. 28, 1920.

Application filed May 28, 1920. Serial No. 384,815.

*To all whom it may concern:*

Be it known that I, HERBERT T. SWEENEY, a citizen of the United States, residing at Chester, in the county of Delaware and State of Pennsylvania, have invented certain new and useful Improvements in Illuminated Radiator-Thermometers, of which the following is a specification.

One object of my invention is to provide a thermometer which can be readily secured to the radiator cap at the front of an automobile and will be so constructed and arranged that a person sitting in the seat of the automobile during the day or night can easily determine, by a glance at the device, the exact temperature and condition of the engine and the cooling medium therefor.

Another object is to make the device of my present invention of a simple and durable construction and so that it can be quickly and cheaply manufactured.

These objects, and other advantageous ends which will be described hereinafter, I attain in the following manner, reference being had to the accompanying drawings in which—

Figure 1 is a front elevation of a device constructed in accordance with my present invention, Fig. 2 is a side elevation of Fig. 1, Fig. 3 is an elevation partly in central section of my improved device, Fig. 4 is a fragmentary section taken on the line 4—4 of Fig. 3, Fig. 5 is an elevation showing the interior of the reflector and the lamp, Fig. 6 is an enlarged fragmentary section of the lamp and its means of connection with the reflector, Fig. 7 is a front elevation of a dial which is constructed in accordance with my invention, Fig. 8 is an edge view of the dial shown in Fig. 7, Fig. 9 is a face view of a transparent disk which I preferably employ, and Fig. 10 is an edge view of the disk shown in Fig. 9.

Referring to the drawings, 11 represents a casing which is preferably made of metal and which includes a part 12 in the form of a ring which has a standard or base portion 13 adapted to be secured to a radiator cap 14. The latter may be of any of the usual constructions and preferably has a depending tube 15 and a thermometer tube 16 projecting upwardly through a hole 17 in the base 13 so as to have its upper portion located within the ring 12. The ring 12 has a recess 18 in which the upper end of the thermometer tube 16 is adapted to extend as clearly shown in Fig. 4 and the thermometer tube may contain a fluid movable upwardly and downwardly due to variation in temperature in the same manner as employed in any ordinary thermometer tube. The ring 12 has an annular cavity 19 at its rear in which is fitted a dial 20; said cavity providing a shoulder 21 immediately to the rear of the thermometer tube and against which the portion of the dial 20, adjacent its peripheral edge, abuts. Immediately to the rear of the dial 20, I preferably place a transparent disk 22 which may be made of celluloid and a flange 23 of a reflector 24 fits within the cavity 19 and abuts the rear of the disk 22. The flange 23 of the reflector is secured by screws 25 to the ring 12 and said reflector has a bulged portion 26 which provides a chamber 27 for an electric incandescent lamp 28. The bottom part of the bulged portion 26 has a sleeve 29 formed therein; said sleeve serving as a receptacle for the bottom of the lamp 28 and is screw threaded at 30 to permit a retaining cap 31 to be screwed thereon to hold a connecting plug 32 within the sleeve 29. The connecting plug is preferably provided with an electric contacting member 33 which is backed by a spring 34; said contacting member engaging the central pole 35 of the electric lamp while the electric conduit wire 36 connects with the plug and tends to complete an electric circuit through the contacting member 33 and the sleeve; it being noted that the device can be arranged in connection with the ordinary lighting system of the automobile so that the other pole of the lamp will be grounded with the frame of the automobile when the radiator cap is screwed in position. However, any means can be used for supplying electric current to the lamp 28. A lens 37 is fitted in the forward portion of the ring 12 and is held in place by a securing ring 38; the latter being secured in place by screws 39 which enter the same holes as those into which the screws 25 fit.

The construction of the dial 20 forms a very important part of my present invention and the structure of said dial 20 will now be specifically described. The dial 20 is preferably made by taking a disk of white translucent material such as paper, parchment or the like and printing or otherwise coloring various sections of the same as clearly shown in Fig. 7. The central vertical portion of this dial is permitted to remain white; said portion being indicated at 40 and the portion 40 is interposed between the thermometer tube 16 and the lamp 28 so that the rays of light from said lamp will penetrate the part 40 and illuminate the thermometer tube throughout its entire height visible through the lens 37. A transverse portion 41, which occupies a position substantially central, is also permitted to remain white with the exception of a desired lettering, such for example as shown by the words "Motor average." These words may be printed or otherwise impressed in black so that the rays of light will not penetrate them. Immediately above the white transverse portion 41 is another transverse part which is made in two sections 42 and 43; said sections at opposite sides of the central part 40 being made black or colored with the exception of words such for example as the word "Hot"; said words being white so that the light from the lamp 25 will shine therethrough. Immediately above the parts 42 and 43 are transverse parts 44 which are uncolored and are therefore white and serve as partitions between the sections 42 and 43 and other sections 45 and 46; said sections 45 and 46 being colored red and located at opposite sides of the central white portion 40; said sections 45 and 46 including white letters of the natural color of the dial 20 such for example as the letters which form the word "Steam." Immediately below the central white portion 41 are two transversely extending sections 47 and 48 which are colored blue and are located at opposite sides of the central white portion 40; said sections being entirely blue with the exception of the words "Cool" which are permitted to remain white. Below the sections 47 and 48 and separating them from lower blue sections 49 and 50 are white transversely extending portions 51 and 52.

In the above description I have named certain colors specifically, however, it will be understood that various other arrangements of colors may be substituted if desired. However, the above mentioned colors I have found in actual practice give exceptionally good results; enabling the ready determining of the level of the fluid in the thermometer tube. By the provision of a dial constructed as above described, it is possible even in an exceptionally long automobile for a person sitting therein to easily determine the temperature of the engine cooling medium in the radiator by a mere glance at the dial and thermometer tube.

The fluid in the thermometer tube shows up clearly without obstruction and the various transverse portions as above described form comparative means which enables the eye to quickly see at a glance not only the height of the thermometer fluid but the actual condition of the engine cooling fluid in the radiator. Furthermore, the transverse white portions 41, 44, 51 and 52 show up bright but not too glaringly to destroy or blur the vision. The central part 40 permits clear vision of the thermometer tube so that the fluid therein can be compared with the various levels defined by the transverse white and colored portions as above described. The various words also show up clearly and the driver or any one else sitting in the automobile is assured of the exact condition and temperature of the cooling fluid and consequently the motor.

I have defined in the specification and claims the parts 41, 44, 51 and 52 as "white," it will be understood, however, that these parts may be made of a cream color, light yellow or any other shade which is substantially white or which produces a substantially white impression upon the eye.

By having the transversely extending white translucent portion 41 of comparatively great width as illustrated in Fig. 7, the same constitutes an extended area so that if the level of the liquid in the thermometer tube is positioned within the width of said portion 41 the observer is assured that any variation within the width of said latter portion is safe and that the engine is at a proper working temperature. The movement of the level of the thermometer fluid above the portion 41 opposite the sections 42 and 43 will immediately show the observer that the cooling medium is hot and when the level of the fluid reaches the level of the parts 45 and 46, the observer will note that steam is being produced and that a dangerous condition is present. In the same manner when the level of the fluid drops opposite the sections 47 and 48 he is notified that the cooling medium is cool and in this manner a driver is enabled to easily determine the condition of the cooling medium and motor at all times. The coloring of the various sections is preferably such that the light will make the various colors bright without diffusion and the transverse white translucent portions make each color section independent and sets them off so that there is no possible chance of error by the observer.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A temperature observing device of the character described including a dial having a white translucent portion and transversely extending portions separated by distinguishing transversely extending translucent portions; a thermometer tube extending lengthwise in front of said white translucent portion and a source of light positioned at the rear of said dial; substantially as described.

2. A temperature observing device of the character described including a dial having a white translucent portion and transversely extending colored translucent portions separated by white translucent portions; a thermometer tube positioned in front of said first white translucent portion in the direction of the length thereof; and a source of light positioned to the rear of said dial; substantially as described.

3. A temperature observing device of the character described including a dial having a white translucent portion and transversely extending colored translucent portions separated by transversely extending white translucent portions, said colored portions within the area thereof including words produced by translucent portions distinguishing from the colored portions; a thermometer tube positioned in front of said first white translucent portion in the direction of the length thereof; and a source of light positioned to the rear of said dial; substantially as described.

4. A temperature observing device of the character described including a dial having a white translucent portion and transversely extending colored translucent portions separated by transversely extending white translucent portions, one of said transverse white translucent portions being of comparatively great width; a thermometer tube positioned in front of said first white translucent portion in the direction of the length thereof; and a source of light positioned to the rear of said dial; substantially as described.

5. A temperature observing device of the character described including a casing having a ring section; a dial fitting said ring section, said dial having a white translucent portion and transversely extending portions separated by distinguishing transversely extending translucent portions; a thermometer tube extending lengthwise in front of said white translucent portion; means providing a chamber to the rear of said casing; and a source of light positioned within said chamber immediately in back of said dial; substantially as described.

In testimony whereof I have signed my name to this specification in the presence of two subscribing witnesses.

HERBERT T. SWEENEY.

Witnesses:
ELIZABETH GARBE,
CHAS. E. POTTS.